US 8,522,320 B2

(12) United States Patent
Kleve et al.

(10) Patent No.: US 8,522,320 B2
(45) Date of Patent: Aug. 27, 2013

(54) METHODS AND SYSTEMS FOR AUTHENTICATING ONE OR MORE USERS OF A VEHICLE COMMUNICATIONS AND INFORMATION SYSTEM

(75) Inventors: Robert Bruce Kleve, Farmington, MI (US); Brian Petersen, Ferndale, MI (US); Ritesh Pandya, Rochester Hills, MI (US); Edward Andrew Pleet, Livonia, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/078,345

(22) Filed: Apr. 1, 2011

(65) Prior Publication Data
US 2012/0254948 A1 Oct. 4, 2012

(51) Int. Cl.
*G06F 7/04* (2006.01)
(52) U.S. Cl.
USPC .............................................................. 726/4
(58) Field of Classification Search
USPC ............... 726/4, 21, 5, 7, 9, 28, 29; 713/168, 713/178
See application file for complete search history.

(56) References Cited

U.S. PATENT DOCUMENTS

| 5,467,070 A | 11/1995 | Drori et al. |
| 5,513,107 A | 4/1996 | Gormley |
| 5,627,510 A | 5/1997 | Yuan |
| 5,635,916 A | 6/1997 | Bucholtz et al. |
| 5,734,336 A | 3/1998 | Smithline |
| 5,828,319 A | 10/1998 | Tonkin et al. |
| 6,018,291 A | 1/2000 | Marble et al. |
| 6,133,825 A | 10/2000 | Matsuoka |
| 6,177,866 B1 | 1/2001 | O'Connell |
| 6,198,996 B1 | 3/2001 | Berstis |
| 6,263,282 B1 | 7/2001 | Vallancourt |
| 6,268,804 B1 | 7/2001 | Janky et al. |

(Continued)

FOREIGN PATENT DOCUMENTS

| CN | 101596895 A | 12/2009 |
| DE | 102007046270 A1 | 4/2009 |

(Continued)

OTHER PUBLICATIONS

Autobiometrics, Com, US Distributor for ATRD Biometric Immobilizer, http://www.autobiometrics.com, Jul. 6, 2011.

(Continued)

*Primary Examiner* — Beemnet Dada
(74) *Attorney, Agent, or Firm* — Jennifer M. Stec; Brooks Kushman P.C.

(57) ABSTRACT

In at least one embodiment, a system for authorizing use of a vehicle communication and information system may include one or more data processors configured to receive information associating one or more devices with a vehicle computer. The data processor(s) may be also configured to receive information identifying a user requesting authorization to command the vehicle controls from the one or more devices associated with the vehicle computer. The user(s) may be authorized to command the vehicle controls from the one or more devices associated with the vehicle computer based on performing an authentication process for authenticating the user, determining that the user is an authenticated user based on the authentication process, and enabling command of one or more vehicle controls from the one or more remote devices via the associated vehicle computer based on the user being authenticated.

12 Claims, 7 Drawing Sheets

(56) References Cited

U.S. PATENT DOCUMENTS

| | | |
|---|---|---|
| 6,271,745 B1 | 8/2001 | Anzai et al. |
| 6,434,455 B1 | 8/2002 | Snow et al. |
| 6,434,486 B1 | 8/2002 | Studt et al. |
| 6,438,491 B1 | 8/2002 | Farmer |
| 6,574,734 B1 | 6/2003 | Colson et al. |
| 6,590,495 B1 | 7/2003 | Behbehani |
| 6,679,702 B1 | 1/2004 | Rau |
| 6,690,260 B1 | 2/2004 | Ashihara |
| 6,737,963 B2 | 5/2004 | Gutta et al. |
| 6,754,562 B2 | 6/2004 | Strege et al. |
| 6,810,309 B2 | 10/2004 | Sadler et al. |
| 6,853,919 B2 | 2/2005 | Kellum |
| 6,859,718 B2 | 2/2005 | Fritz et al. |
| 6,871,145 B2 | 3/2005 | Altan et al. |
| 6,906,619 B2 | 6/2005 | Williams et al. |
| 7,057,501 B1 | 6/2006 | Davis |
| 7,075,409 B2 | 7/2006 | Guba |
| 7,102,496 B1 | 9/2006 | Ernst, Jr. et al. |
| 7,124,027 B1 | 10/2006 | Ernst, Jr. et al. |
| 7,148,790 B2 | 12/2006 | Aoyama et al. |
| 7,161,563 B2 | 1/2007 | Vitale et al. |
| 7,173,903 B2 | 2/2007 | Remboski et al. |
| 7,207,041 B2 | 4/2007 | Elson et al. |
| 7,228,213 B2 | 6/2007 | Sakai et al. |
| 7,266,438 B2 | 9/2007 | Kellum et al. |
| 7,340,332 B2 | 3/2008 | Underdahl et al. |
| 7,356,394 B2 | 4/2008 | Burgess |
| 7,366,892 B2 | 4/2008 | Spaur et al. |
| 7,375,620 B2 | 5/2008 | Balbale et al. |
| 7,391,305 B2 | 6/2008 | Knoll et al. |
| 7,484,008 B1 | 1/2009 | Gelvin et al. |
| 7,602,782 B2 | 10/2009 | Doviak et al. |
| 7,812,712 B2 | 10/2010 | White et al. |
| 8,050,817 B2 | 11/2011 | Moinzadeh et al. |
| 8,050,863 B2 | 11/2011 | Trepagnier et al. |
| 2002/0097145 A1 | 7/2002 | Tumey et al. |
| 2003/0079123 A1 | 4/2003 | Mas Ribes |
| 2003/0217148 A1 | 11/2003 | Mullen et al. |
| 2004/0046452 A1 | 3/2004 | Suyama et al. |
| 2004/0124968 A1* | 7/2004 | Inada et al. .................. 340/5.72 |
| 2004/0227642 A1 | 11/2004 | Giles et al. |
| 2004/0236475 A1 | 11/2004 | Chowdhary |
| 2005/0021597 A1 | 1/2005 | Derasmo et al. |
| 2005/0033517 A1 | 2/2005 | Kondoh et al. |
| 2005/0134115 A1 | 6/2005 | Betts, Jr. et al. |
| 2005/0177635 A1 | 8/2005 | Schmidt et al. |
| 2005/0190039 A1 | 9/2005 | Aoyama |
| 2005/0193212 A1 | 9/2005 | Yuhara |
| 2005/0261816 A1 | 11/2005 | DiCroce et al. |
| 2006/0056663 A1 | 3/2006 | Call |
| 2006/0150197 A1 | 7/2006 | Werner |
| 2006/0156315 A1 | 7/2006 | Wood et al. |
| 2006/0250224 A1 | 11/2006 | Steffel et al. |
| 2007/0050854 A1 | 3/2007 | Cooperstein et al. |
| 2007/0100514 A1 | 5/2007 | Park |
| 2007/0103339 A1 | 5/2007 | Maxwell et al. |
| 2007/0109094 A1* | 5/2007 | Sahai ........................... 340/5.72 |
| 2008/0109653 A1 | 5/2008 | Yokohama |
| 2008/0148374 A1 | 6/2008 | Spaur et al. |
| 2008/0275604 A1 | 11/2008 | Perry et al. |
| 2009/0045928 A1 | 2/2009 | Rao et al. |
| 2009/0167524 A1* | 7/2009 | Chesnutt et al. ......... 340/539.19 |
| 2009/0195370 A1 | 8/2009 | Huffman et al. |
| 2009/0309709 A1 | 12/2009 | Bevacqua et al. |
| 2010/0004818 A1* | 1/2010 | Phelan ........................... 701/35 |
| 2010/0007479 A1 | 1/2010 | Smith |
| 2010/0039224 A1 | 2/2010 | Okude et al. |
| 2010/0057586 A1 | 3/2010 | Chow |
| 2010/0097178 A1 | 4/2010 | Pisz et al. |
| 2010/0148923 A1 | 6/2010 | Takizawa |
| 2010/0191973 A1* | 7/2010 | Huntzicker et al. .......... 713/176 |
| 2011/0071720 A1 | 3/2011 | Schondorf et al. |
| 2011/0071725 A1 | 3/2011 | Kleve et al. |
| 2011/0071734 A1 | 3/2011 | Van Wiemeersch et al. |
| 2011/0105097 A1 | 5/2011 | Tadayon et al. |
| 2011/0106374 A1 | 5/2011 | Margol et al. |
| 2011/0213629 A1 | 9/2011 | Clark et al. |
| 2011/0295444 A1 | 12/2011 | Westra et al. |
| 2012/0284702 A1 | 11/2012 | Ganapathy et al. |

FOREIGN PATENT DOCUMENTS

| | | |
|---|---|---|
| JP | 2008195253 | 8/2008 |
| JP | 2008303630 | 12/2008 |
| WO | WO0125572 A1 | 4/2001 |

OTHER PUBLICATIONS

Sales@usasupremetech.com, In the U.S. a Car is Stolen Every 26 Seconds, The Wave of the Future, Biometrics Authentication, An Introduction.

Ford Motor Company, "SYNC with Navigation System," Owner's Guide Supplement, SYNC System Version 1 (Jul. 2007).

Ford Motor Company, "SYNC," Owners's Guide Supplement, SYNC System Version 1 (Nov. 2007).

Ford Motor Company, "SYNC with Navigation System," Owner's Guide Supplement, SYNC System Version 2 (Oct. 2008).

Ford Motor Company, "SYNC," Owner's Guide Supplement, SYNC System Version 2 (Oct. 2008).

Ford Motor Company, "SYNC with Navigation System," Owner's Guide Supplement, SYNC System Version 3 (Jul. 2009).

Ford Motor Company, "SYNC," Owner's Guide Supplement, SYNC System Version 3 (Aug. 2009).

Kermit Whitfield, "A hitchhiker's guide to the telematics ecosystem," Automotive Design & Production, Oct. 2003, http://findarticles.com, pp. 103.

* cited by examiner

METHODS AND SYSTEMS FOR
AUTHENTICATING ONE OR MORE USERS
OF A VEHICLE COMMUNICATIONS AND
INFORMATION SYSTEM

BACKGROUND

1. Technical Field

Various embodiments relate to an authentication process for authenticating one or more user of a vehicle communication and information system. In some embodiments, one or more vehicle users may be authenticated before operating one or more vehicle controls from a device remote from a vehicle.

2. Background Art

For a variety of reasons including, but not limited to, identification, security, and safety, a vehicle owner or user may be authenticated as an authorized user of a vehicle communications and information computing system before the system can be used by the vehicle owner. Typically, this authentication may occur prior to first use of the vehicle and/or vehicle communications and information system. The authentication may occur at a dealership by a dealer or dealer representative. Additionally or alternatively, the authorization process may occur through a telephone call, or other communication, to the automotive OEM (or an entity associated with the automotive OEM responsible for handling such calls) by the dealer, the vehicle owner, or other authorized person.

SUMMARY

One aspect is a system for authorizing use of a vehicle communication and information system. The system includes one or more data processors. The data processor(s) may be configured to receive information associating one or more devices remote from a vehicle with a vehicle computer. Further, the data processor(s) may be configured to receive information identifying a user. The user may request authorization to command one or more vehicle controls from the one or more devices which are associated with the vehicle computer. The data processor(s) may be further configured to authorize the user to command one or more vehicle controls from the one or more devices associated with the vehicle computer.

Authorizing the user(s) may include performing an authentication process for authenticating the user. Further, it may be determined that the user is an authenticated user based on the authentication process. Based on the user being authenticated, the command of one or more vehicle controls from the one or more remote devices via the associated vehicle computer may be authorized.

In some embodiments, the authentication process may include receiving one or more inputs for authentication and authenticating the user based on the one or more inputs for authentication. The one or more inputs may be one or more authentication items including, but not limited to, one or more touch-based inputs, information from one or more vehicle key transponders, one or more voice commands, one or more codes, one or more patterns of maneuvers, or at least one question and answer process.

In some embodiments, the inputs for authentication may be received in the vehicle.

Another aspect is a computer-implemented method for authorizing use of the vehicle communication and information system. The method may include receiving information at one or more data processors indicating that a vehicle communications and information system (VCIS) is associated with one or more command devices from which one or more users command the VCIS. The method may also include authorizing at the data processor(s) the one or more users to command the VCIS from the one or more associated command devices.

The authorizing may include receiving information identifying one or more authenticating devices associated with the one or more users. Further, an authentication process may be performed using the identified authenticating devices to authenticate the one or more users. If the user(s) are authenticated based on the authentication process, the user(s) may command the VCIS from the one or more associated command devices.

In some embodiments, the authentication process may include initiating a timer to measure a time period during which the one or more users are authenticated using the identified authenticating devices. The one or more users may command the VCIS from the one or more associated command devices if authenticated during the time period.

In some embodiments, the authentication process may include counting a number of authentication attempts during the time period. If the number of attempts is exceeded, the user(s) may not be authenticated.

Another aspect is a method comprising receiving information at a computer associating one or more devices (e.g., a nomadic device or a personal computer) for commanding vehicle controls with a vehicle. Further, the method may include receiving information at the computer identifying a user who may request authorization to command vehicle controls from the devices. The method may also include authorizing the command(s) from the devices.

The authorizing may include performing an authentication process to authenticate the user(s). If the user(s) are authenticated based on the process, the user(s) may command the vehicle controls from the devices.

In some embodiment, the authentication process may include receiving one or more inputs for authentication and authenticating the user(s) based on the one or more inputs for authentication.

The one or more inputs for authentication may be one or more authentication items. These authentication items may include, but are not limited to, one or more touch-based inputs, information from one or more vehicle key transponders, one or more voice commands, one or more codes, one or more patterns of maneuvers, or at least one question and answer process.

In some embodiments, the authentication process may further include initiating a timer to measure a time period during which the one or more inputs for authentication are received. Further, the authentication process may include authenticating the user(s) based on the one or more inputs for authentication if received during the time period.

In some embodiments, the authentication process may further include counting a number of authentication attempts and authenticating the user(s) based on the one or more inputs for authentication unless the number of attempts is exceeded.

These and other aspects will be better understood in view of the attached drawings and following detailed description of the invention.

BRIEF DESCRIPTION OF THE DRAWINGS

The figures identified below are illustrative of some embodiments of the invention. The figures are not intended to be limiting of the invention recited in the appended claims. The embodiments, both as to their organization and manner of operation, together with further object and advantages

DETAILED DESCRIPTION

A typical authentication process for authenticating vehicle owners or users to use the vehicle's telematics system may not only be expensive for an OEM, but also inconvenient for the vehicle owner. Authentication may be performed through a human operator with access to information for authenticating the vehicle user(s). This may include, for example, access to remote systems, such as a DMV's or Secretary of State's office, to verify the identity of the vehicle owner/users. This may leave a limited time window for the user to be authenticated (e.g., due to hours of operation). Further, using human operators can be expensive for the OEM because of the added cost of employing these individuals. Therefore, using, for example (and without limitation), a nomadic device (such as a cell phone), a vehicle owner and/or user can be authenticated to use the vehicle's communication and information computing system (VCIS) without the issues that may be associated with typical authentication processes.

Detailed embodiments of the invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

Additionally, the disclosure and arrangement of the figures is non-limiting. Accordingly, the disclosure and arrangement of the figures may be modified or re-arranged to best fit a particular implementation of the various embodiments of the invention.

Figure 1:
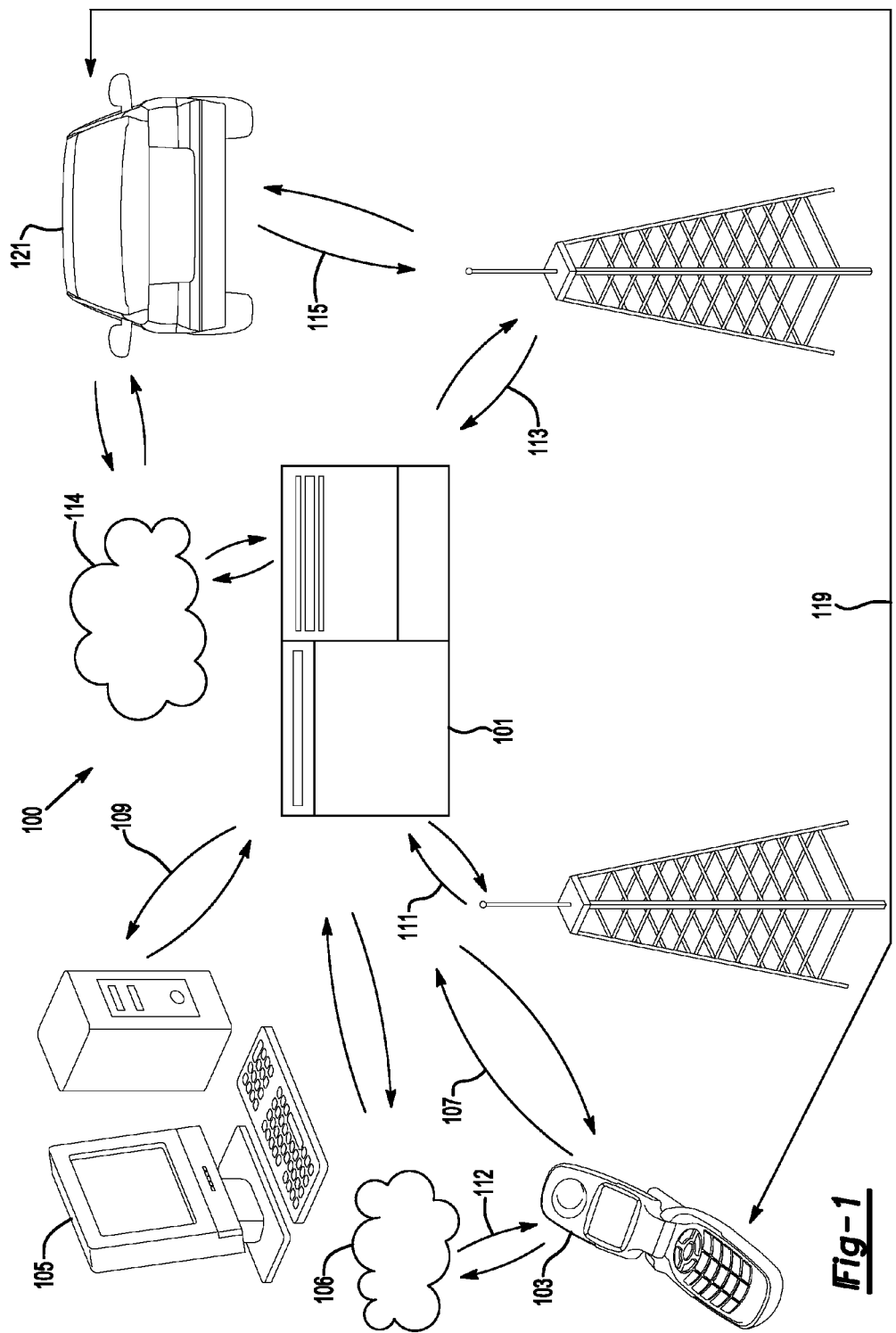
FIG. 1 shows an illustrative example of a communication system through which a nomadic device can communicate with a vehicle according to one of the various embodiments.

FIG. 1 shows an illustrative example of a
communication system 100 through which a nomadic device can communicate with a vehicle 121. In this illustrative embodiment, a nomadic device (e.g., without limitation, a cellular phone) 103 is used to send a communication through a cellular network 107. This communication is relayed through a network 111 (e.g., without limitation, the cellular network, the internet, etc.) to a centralized system 101. In another embodiment, the nomadic device 103 may send a communication through network 112 which may include, but is not limited to, WiFi or WiMax. This communication is relayed through a network 106 (e.g., without limitation, the internet,) to a centralized system 101.

In this illustrative embodiment, the centralized system is a server system that includes processing capability for incoming nomadic device signals designated to interact with a remote vehicle 121.

For example, the server(s) 101 may include an automated call server and/or web host. Further, the server(s) 101 may route an incoming signal from a nomadic device (ND) 103 to the appropriate remote vehicle. Data sent in this fashion may be sent using data-over-voice, a data-plan, or in any other suitable format.

Data can also be sent to the remote vehicle 121 through the server(s) 101 using a personal computer 105. In this case, the data is likely, although not necessarily, sent over the internet 109.

Once the server(s) 101 receive the incoming data request from the remote source 103, 105, the message is processed and/or relayed to a vehicle 121. The vehicle may be identified by a header associated with one or more incoming data packets, or may be identifiable based on a database lookup, for example.

The relay to the vehicle 121 is sent out from the server(s) 101 through a network (e.g., without limitation, a cellular network 113, the internet, etc.) and passed through a cellular network 115 to the vehicle 121. In another embodiment, the relay may be passed through network 114 (e.g., WiFi or WiMax) and to the vehicle 121. A remote communication module 200 in the vehicle 121 receives the signal sent from the server(s) 101 and processes it or relays it to an appropriate processing system within the vehicle 121.

In at least one illustrative embodiment, the vehicle 121 is also outfitted with a communication transceiver, such as, but not limited to, a BLUETOOTH transceiver. This transceiver may allow communication with the nomadic device 103 using a direct signal 119.

It should be understood that the communication between nomadic device 103, server 101, and vehicle 121 may be performed in a number of ways and FIG. 1 is presented for illustrative purposes. FIG. 1 illustrates various alternatives for communicating data. For example, and without limitation, data communication may be partially or entirely cellular or WiFi, or a combination of cellular and WiFi.

FIGS. 2a-d show illustrative examples of vehicle-based communication modules that provide communication to a remote network.

Figure 2A:
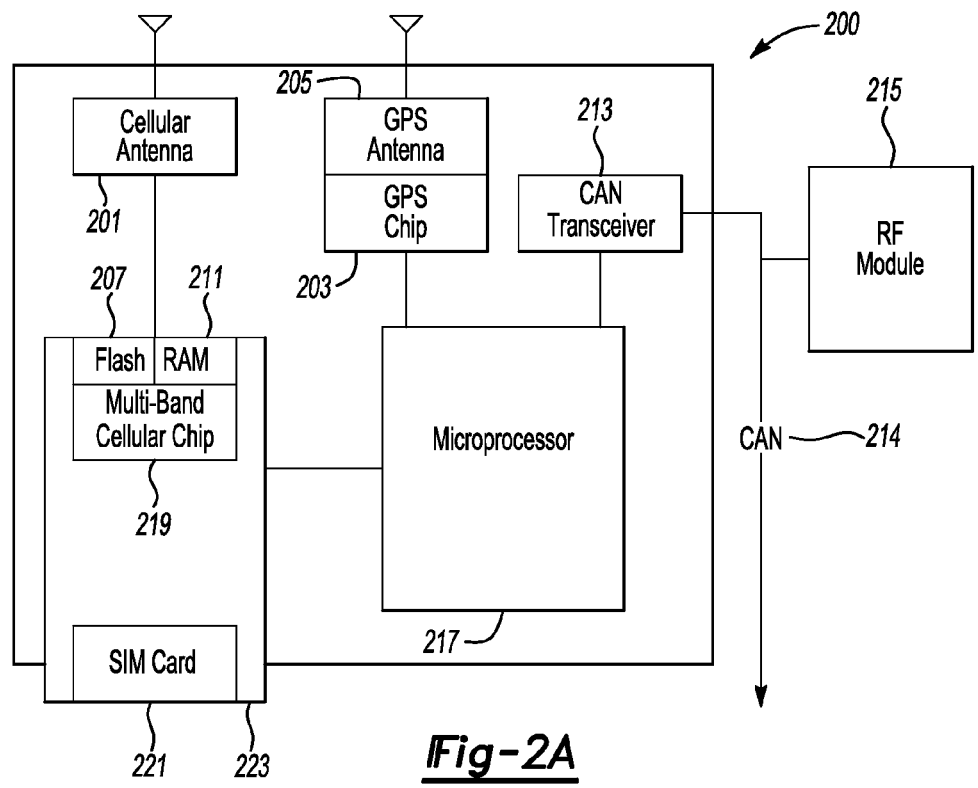
FIGS. 2a-d show illustrative examples of vehicle-based communication devices that provide communication to a remote network according to one of the various embodiments.

FIG. 2a shows an illustrative example of a communication module 200 combined with a GPS module, wherein a cellular module and GPS are on different boards.

In this illustrative embodiment, a communications module 200 can include a cellular (e.g., and without limitation, GSM or CDMA) antenna 201 that communicates with a remote server over a cellular network. The received cellular signal may be sent from the cellular antenna 201 to a multi-band cellular (e.g., and without limitation, GSM or CDMA) decoder 219 that processes the received signal to produce information usable by the microprocessor 217.

In this illustrative embodiment, the multi-band cellular chip 219, including flash memory 207 and RAM 211, is installed in the module as part of a removable device 223 including a SIM card 221. The SIM card 221 may contain user identifying information that allows access to the cellular network under a particular user's plan.

Additionally, the module includes a GPS chip 203 that can process and decode a signal from the GPS antenna 205 and send this information to a microprocessor 217.

The microprocessor is also in communication with a vehicle data bus that provides access to various vehicle modules, such as RF module 215. Other modules not shown include, but are not limited to, the vehicle cluster, a remote (off-board) GPS system, a radio module, etc. Non-limiting examples of a vehicle data bus include an SAE J1850 bus, a CAN bus, a GMLAN bus, and any other vehicle data buses known in the art. For illustration purposes only, FIGS. 2a-2d are represented as using a CAN bus.

Figure 2B:
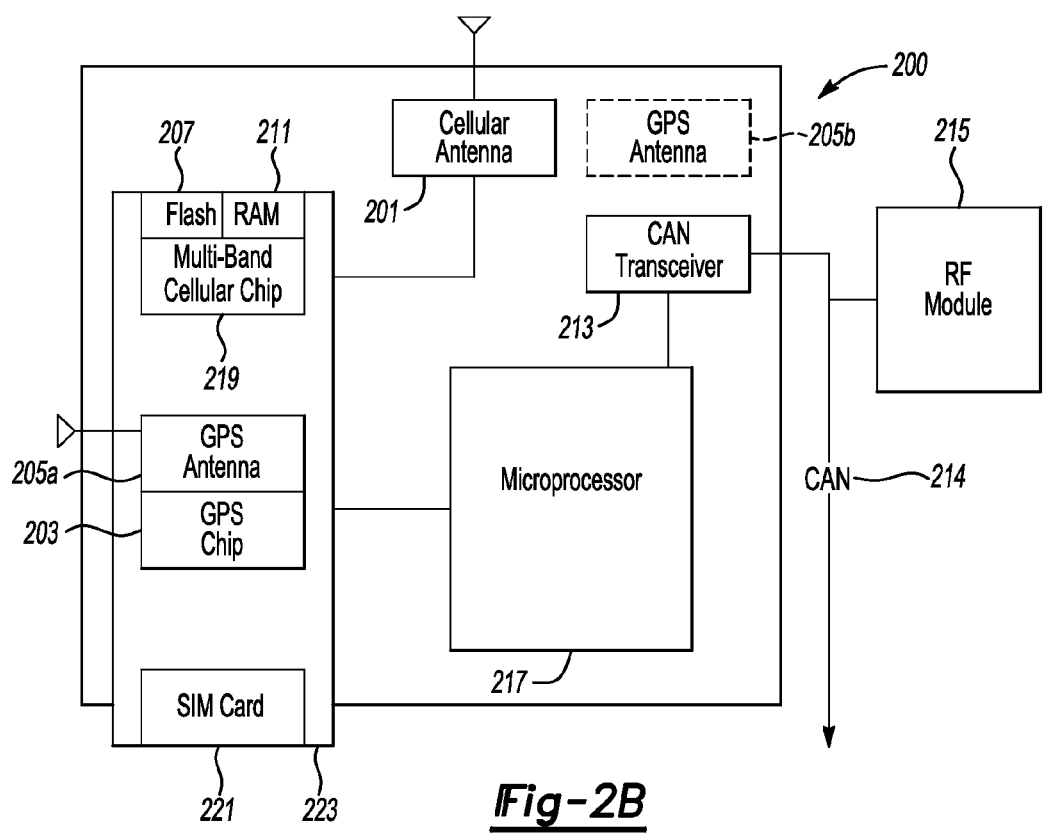

FIG. 2b shows a second exemplary embodiment in which a cellular chip and GPS are on the same board 223. In this illustrative embodiment, the removable board (this board may also be permanently attached to the module) 223 may contain the SIM card 221, a GPS module including a GPS chip 203 and a GPS antenna 205a, and the Multi-band cellular chip 219 including flash memory 207 and RAM 211.

In another embodiment, the GPS antenna 205b may be attached to the module separately from this board 223. When a signal comes in from the cellular antenna 201 and/or the GPS antenna 205b, the signal may be sent to the corresponding cellular/GPS chip 203 for processing, and then passed to the microprocessor 217. The microprocessor 217 interfaces with the CAN transceiver 213 to connect to a vehicle network 214 and vehicle modules such as RF module 215.

Figure 2C:
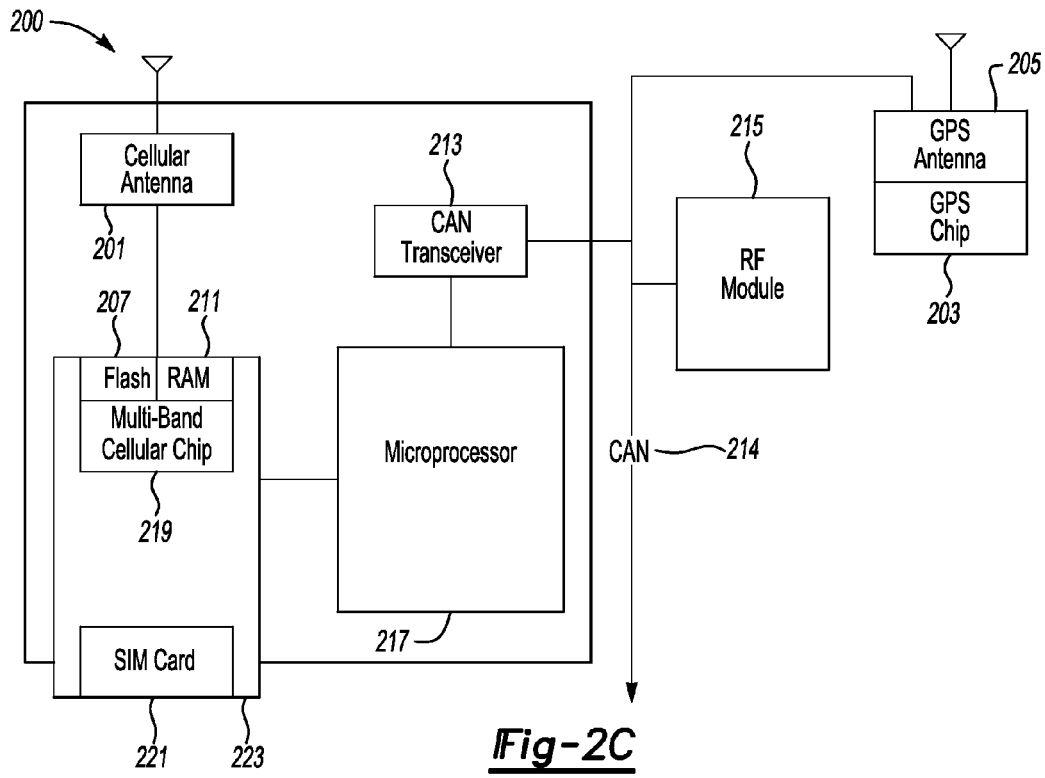

FIG. 2c shows yet another exemplary embodiment in which the cellular module is standalone. In this illustrative embodiment, the GPS module containing the GPS antenna 205 and the GPS chip 203 may connect to the microprocessor 217 through the CAN transceiver 213. Other vehicle modules, such as an RF module 215 can also connect to the microprocessor through the CAN transceiver 213.

In this illustrative embodiment, the removable board 223 may contain a SIM card 221 and a multi-band cellular chip 219, as well as a flash memory 207 and RAM 211. Signals from the cellular antenna 201 may be sent to the board 223 for processing by the multi-band cellular chip 219 before being sent to the microprocessor 217.

Figure 2D:
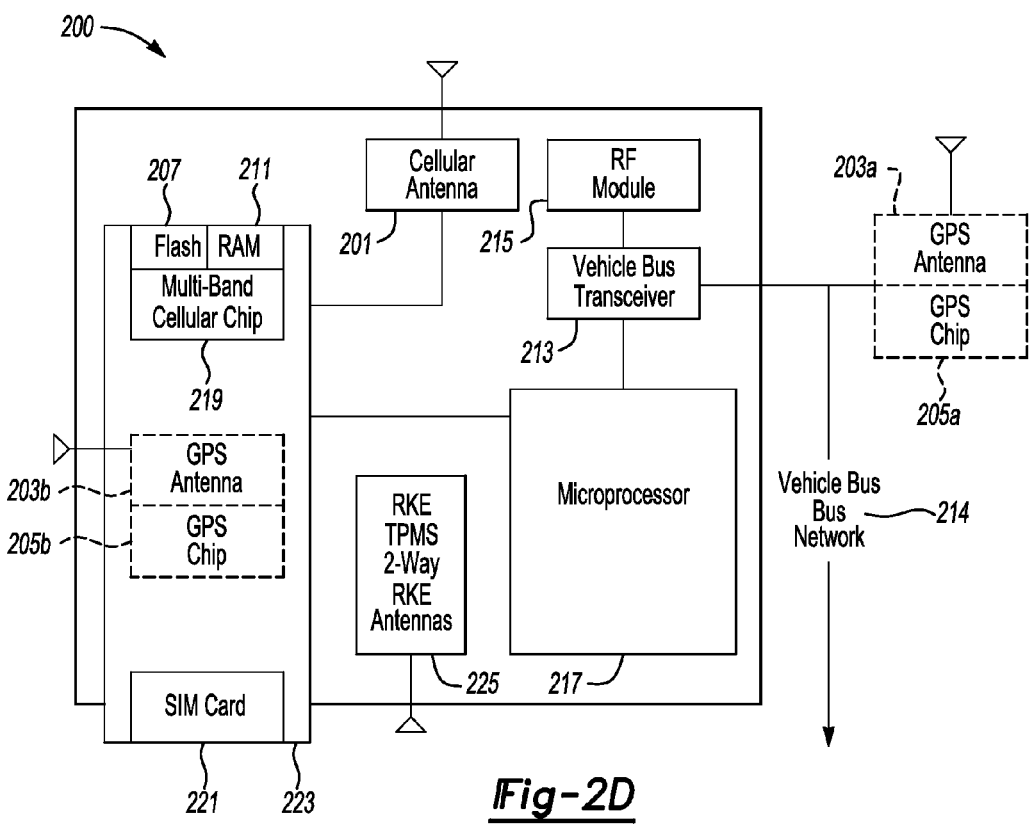

FIG. 2d shows still another exemplary embodiment in which a cellular module is combined with an RF module 215 in the communications module 200. The RF module 215 may continue to talk to the microprocessor 217 through the CAN transceiver 213. In this illustrative embodiment, the GPS module, including the GPS antenna 203a, 203b and GPS chip 205a, 205b can be located within the communications module 200 or located elsewhere in the vehicle, in which case it may communicate with the microprocessor 217 through the CAN transceiver 213.

Again, in this embodiment, the cellular antenna 201 may send a signal to the multi-band cellular 219, including flash memory 207 and RAM 211. The signal may be processed and sent to the microprocessor 217. The multi band cellular chip 219 may be located on a removable circuit board 223, which may also include a SIM card 221.

In some embodiments, input(s) may be received in the vehicle 121 through tactile and/or audible inputs. Accordingly, the module 200 may process such inputs received from one or more vehicle microphones (not shown) and one or more touch-sensitive vehicle controls (not shown) via vehicle network 214.

Figure 3:
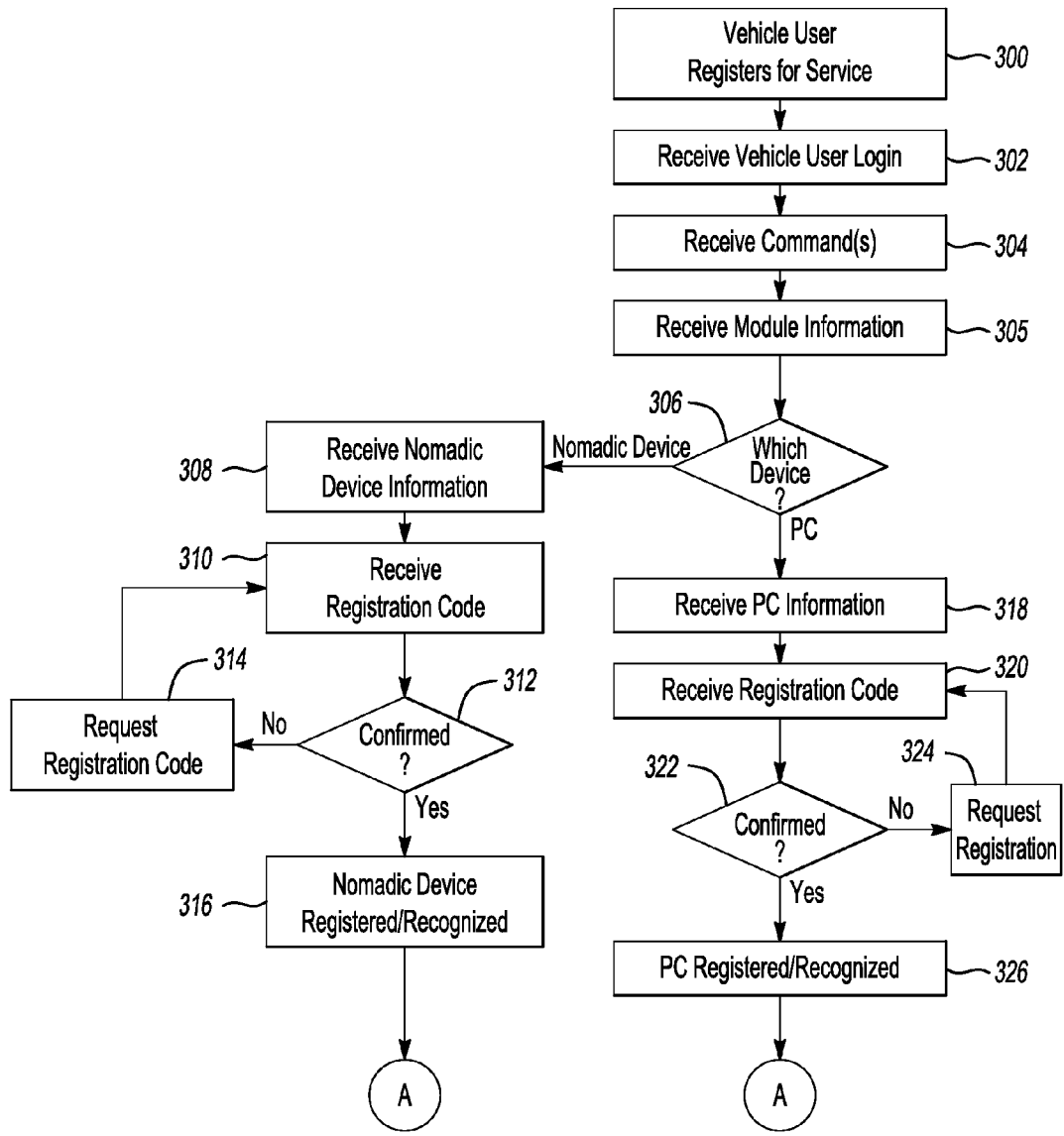
FIG. 3 illustrates a process for registering a device for use with a vehicle communications and information computing system.

FIG. 3 illustrates a process for registering a user device for use with the system 100 by a vehicle user (e.g., one or more drivers and/or one or more passengers). The registration process may occur any time the system is used or trying to be used including, but not limited to, before first use and/or with every use of the system.

Use of the communications system 100 may be provided once a vehicle user is a registered user. Accordingly, a vehicle user may register one or more devices (nomadic device 103 and/or personal computer 105) to use the communications system 100 (block 300) in order to gain access to various vehicle-based services from the nomadic device 103 and/or personal computer 105. Examples of such vehicle-based services, without limitation, may include remote lock and unlock, remote start, vehicle tracking, remote control of vehicle controls (e.g., and without limitation, radio and HVAC), data download, and others.

Registration may occur from a nomadic device 103 and/or personal computer 105 using an Internet connection. In some embodiments, the vehicle user may download a software application (e.g., a mobile application) to the personal computer 105 and/or nomadic device 103. Using this application, the vehicle user may remotely operate one or more vehicle functions and/or controls via system 100. In order to download this application, the vehicle user may additionally or alternatively register for the service. Registration may occur, for example, through a website.

In some embodiments, the applications may be located and executing on a remote computing system, such as server 101 (or a different server in communication with system 100). In this case, an application programming interface (API) may be installed on the nomadic device 103 and/or personal computer 105 and/or a web-based interface may be used in order to operate the remotely executing application.

The registration process may be, but not necessarily, a single event such that the step may not occur subsequent to a first use of the system 100. During the registration process, the vehicle user may establish one or more forms of identification to identify the vehicle user. Such forms of identification may include a username and password, one or more security questions, a VIN, a mobile identification number (MIN), or a combination of such identification items. Additionally, during the registration process one or more identifiers, such as a phone number, associated with the vehicle user may be provided to identify the nomadic device 103 and/or PC 105 which serves as the primary or controlling device. Also, during the registration process, an identification associated with the module 200 (e.g., and without limitation, a VIN or Electronic Serial Number) may be provided to identify the vehicle having the vehicle controls which may be controlled via the vehicle communication system 100.

Once the user is registered, the vehicle user may login from the nomadic device 103 and/or personal computer 105 (block 302). A login may include, without limitation, inputting the vehicle user identification information created by the user during registration. The input may be one or more touch-sensitive inputs and/or one or more voice inputs. In some embodiments, the login information may be saved in memory. In this case, the vehicle user may use the vehicle-based services without inputting login information.

One or more commands for a vehicle-based service may be input and received by the personal computer 105 or nomadic device 103 (block 304). Where the nomadic device 103, personal computer 105, or the remote computing system has software application installed, this application may receive the command(s). Such commands may be input using tactile and/or audible inputs. Audible inputs may include one or more spoken commands.

Further, vehicle communication module information may be received identifying the vehicle communication module 200 (block 305). Module information may include, for example, an electronic serial number associated with the module 200. This information may be received from the vehicle user via user input. The module information may be received from the module 200 by the user after a key-on event in the vehicle. The user may input this information at the ND 103 and/or PC 105.

In some embodiments, the module information may be stored in memory at one or more of the nomadic device 103, personal computer 105, or the remote computing system during, for example, registration. In this case, the module information may be received from memory. In some embodiments, the module information may be an electronic serial number (ESN) associated with the module 200. This module information may be used to tie the user device (nomadic device 103 and/or personal computer 105) to the module 200 so that data and information may be exchanged.

Since a vehicle user may command one or more vehicle controls from a nomadic device or a personal computer, either or both devices may be registered. As represented by block 306, one or more determinations may be made relating to the type of device used by the vehicle user.

If a nomadic device 103 is used, nomadic device information may be obtained in order for the server 101 to identify the nomadic device (block 308). The nomadic device information may be input manually by a vehicle user from the nomadic device 103 or obtained automatically. Such information may include a mobile identification number (e.g., a phone number).

Additionally, one or more registration codes may be input to and received by the nomadic device 103 (block 310) which may be used by the system 100 (e.g., at server 101) to confirm (block 312) that the nomadic device 103 (and, therefore, the vehicle user) is registered (block 316). The registration code (s) may be received by a vehicle user from the OEM (via, for example, a vehicle dealer or a third-party (e.g., a telematics service provider) either through a physical exchange (e.g., in-person or in a telephone call) or from an Internet-based exchange (e.g, through an email exchange or a website). Once received, the code may be input by the vehicle user. In some embodiments, the registration code (and any associated authorization codes) may periodically change and, as such, a new registration code may be received and input by the vehicle user. The registration code(s) may include numbers, letters, characters, or a combination of numbers, letters, and characters. Additionally, the code(s) may comprise graphics and colors. In some embodiments, the registration code(s) may be input by the vehicle user and stored in memory (e.g., locally or remotely) so that, thereafter, the code is automatically obtained.

The server 101 may store a registration code which may be compared to the registration code received by the nomadic device 103 as part of the confirmation process (block 312) to register the nomadic device 103 (block 316). The confirmation process may occur at server 101. In some embodiments, the comparison may be made to confirm that the codes are the same. Alternatively, the comparison may be made of different, but complementary codes. As one non-limiting example, the registration code from the vehicle user may be "ABCD" while the registration code on the server 101 may be "1234." Accordingly, the server 101 may receive the "ABCD" registration code and, based on the correspondence between "ABCD" and "1234," the nomadic device may be recognized (block 316).

If the registration code is not confirmed (block 312), the registration code may be requested and, in some embodiments, the request presented at the nomadic device (block 314). The registration code may be re-entered (block 310).

Referring back to block 306, if the vehicle user is using personal computer 105, information about the personal computer 105 may be obtained in order for the server 101 to identify the personal computer 105 (block 318). Non-limiting examples of personal computer information may include an IP address, a MAC address, or other like identifier. This information may be input by the vehicle user or obtained automatically.

As with when a nomadic device 103 is used, a registration code may be input to and received by the personal computer 105 (block 320) so that the personal computer 105 is registered (block 326). If the registration code(s) is not confirmed, a request for the registration code may be transmitted to the personal computer 105 and, in some embodiments, presented at the computer 105 (block 324). Details of the confirmation process (block 322) and further details about the registration code(s) are described above. Accordingly, for purposes of brevity, these details are not herein repeated. In some embodiments, the process illustrated in FIG. 3 may be time limited. Accordingly, a timer (e.g., a clock on the nomadic device 103, the personal computer 105, or the server 101) may be used to confirm that the registration process is performed within a predetermined time.

As represented by circle block A, the authentication process may further include one or more processes at the vehicle 121. One non-limiting example of this authentication process is provided in FIG. 4.

Figure 4A:
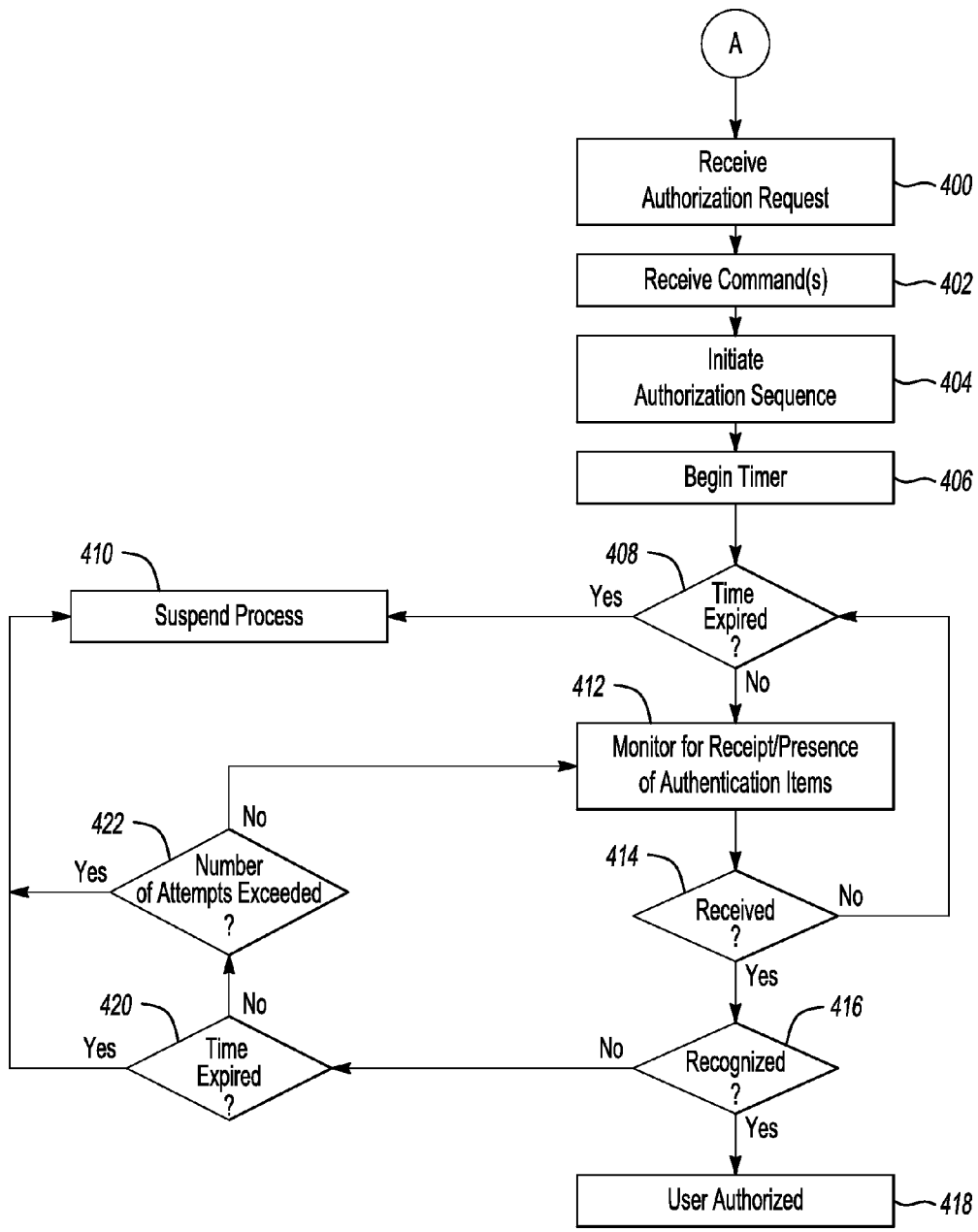
FIG. 4A illustrates a process for authorizing use of a vehicle communications and information computing system according to one embodiment.

The authentication request may be received in the vehicle 121 by the module 200 (block 400). In some embodiments, the authentication request may not be received until the registration code(s) is confirmed. In other embodiments, the authentication request may be received at any time. Accordingly, the order of the processes illustrated in FIGS. 3 and 4 is non-limiting and may be modified to best fit the particular implementations of the invention.

The one or more commands for vehicle-based services from the vehicle user may be received by the module 200 (block 402). The command(s) may be transmitted to the vehicle 121 from nomadic device 103 or personal computer 105 directly or via server 101.

The authentication sequence may be initiated in the vehicle (block 404). The module 200 may monitor for the receipt or presence of one or more authentication items (block 412). The authentication items may include, but are not limited to, one or more of the following, individually or in combination: 1 vehicle key, 2 or more vehicle keys, voice, one or more codes (e.g., numeric, alphabetic, or alphanumeric), a pattern of maneuvers, or a question and answer process. In some embodiments, the module may monitor that one or more of these authentication items are within the vehicle. As one non-limiting example, the RF module (e.g., a PEPS receiver) may monitor for the presence of at least two programmed vehicle keys. If detected, the vehicle user may be confirmed as authenticated and, further, in the vehicle.

In other alternative or additional embodiments, the module may monitor for authentication items that are received from a remote source (such as nomadic device 103 and/or personal computer 105). As one non-limiting example, the module 200 may monitor for a code (which may be different than the registration code described with respect to FIG. 3) or a pattern of maneuvers input at the nomadic device 103 or personal computer 105. The software application may receive these authentication items and transmit a confirmation (e.g., and without limitation, a confirmation flag) indicating the authentication status of the vehicle user based on the authentication item (e.g., the code or the maneuvers). The module, in turn, may monitor for the presence of this confirmation flag (block 412).

Of course, the code or maneuvers (in the non-limiting example above) may be provided in the vehicle. For example, the vehicle user may input the code using the vehicle's HMI (e.g., and without limitation, a touchscreen display, a microphone, one or more controls in the center stack, a vehicle keypad, and others). Accordingly, the monitoring may be for authentication items at least some of which may be provided in the vehicle or remote from the vehicle.

In some embodiments, the authentication sequence may be time limited. Accordingly, if the vehicle-based authentication sequence is not completed within the time period, the command(s) for vehicle-based services rejected. In this case, a timer may be initiated as part of the authentication sequence (block 406). The module 200 may use a vehicle clock, a GPS clock, a crystal oscillator, or other like timer for measuring the time. The time period may be measured in seconds, minutes, clock cycles, or variations thereof.

In the illustrative embodiment of FIG. 4, monitoring for the receipt and/or presence of the authentication items may occur if the monitored period of time has not expired (block 408). Otherwise, the authorization process may be suspended (block 410). In some embodiments, when the process is suspended, the authentication process may be restarted.

If one or more authentication items have not been received (block 414), the module 200 may continue to monitor for the authentication item(s) until the time has expired (block 408). Additionally, the time may continue to be monitored if one or more authentication items have been received, but the items are not valid or recognized (block 416). Non-limiting examples where one or more authentication items may not be recognized include, but are not limited to: one key in the vehicle where two are required, incorrect code(s), incorrect maneuver(s), voice is not recognized, and the like. Accordingly, if the time has not expired (block 420), one or more authentication items may continue to be provided (block 412) unless the number of attempts has been exceeded (block 422). The number of attempts may be predetermined by the OEM (or VCIS provider). In some embodiments, the vehicle user may get a single attempt. Once the number of attempts has been exceeded, the authorization process may be suspended (block 410). In some embodiments, the authentication process may be restarted.

It will be appreciated that the time periods 408 and 420 may comprise a single time period. For example, the receipt (block 412) and recognition (block 416) of the authentication items may occur in the same time period in order for the user to be authorized. Alternatively, the time periods 408,412 may be separate time periods measured by separate timers or resetting a timer to measure the time of receipt (block 414) or recognition (block 416) of the authentication items.

If the time has expired, the process may be suspended (block 410). In some embodiments, the authentication process may be restarted.

If one or more authentication items are recognized (block 416), the vehicle user may be authenticated and authorized to use the VCIS and the command(s) accepted (block 418). In some embodiments, recognition of the authentication item(s) may indicate that an authorized user is in the vehicle.

In some embodiments, the vehicle user may be provided with instructions for the authentication process. These instructions may be presented audibly and/or visually at the nomadic device 103, personal computer 105, and/or in the vehicle (e.g., and without limitation, at a vehicle display). These instructions may be provided as the vehicle user performs each step of the authorization process. In some embodiments, the instructions may not be provided until is apparent that the vehicle user requires assistance. As one non-limiting, non-exhaustive example, the vehicle user may be provided instructions if the number of times to input the authentication item(s) has been exceeded.

Figure 4B:
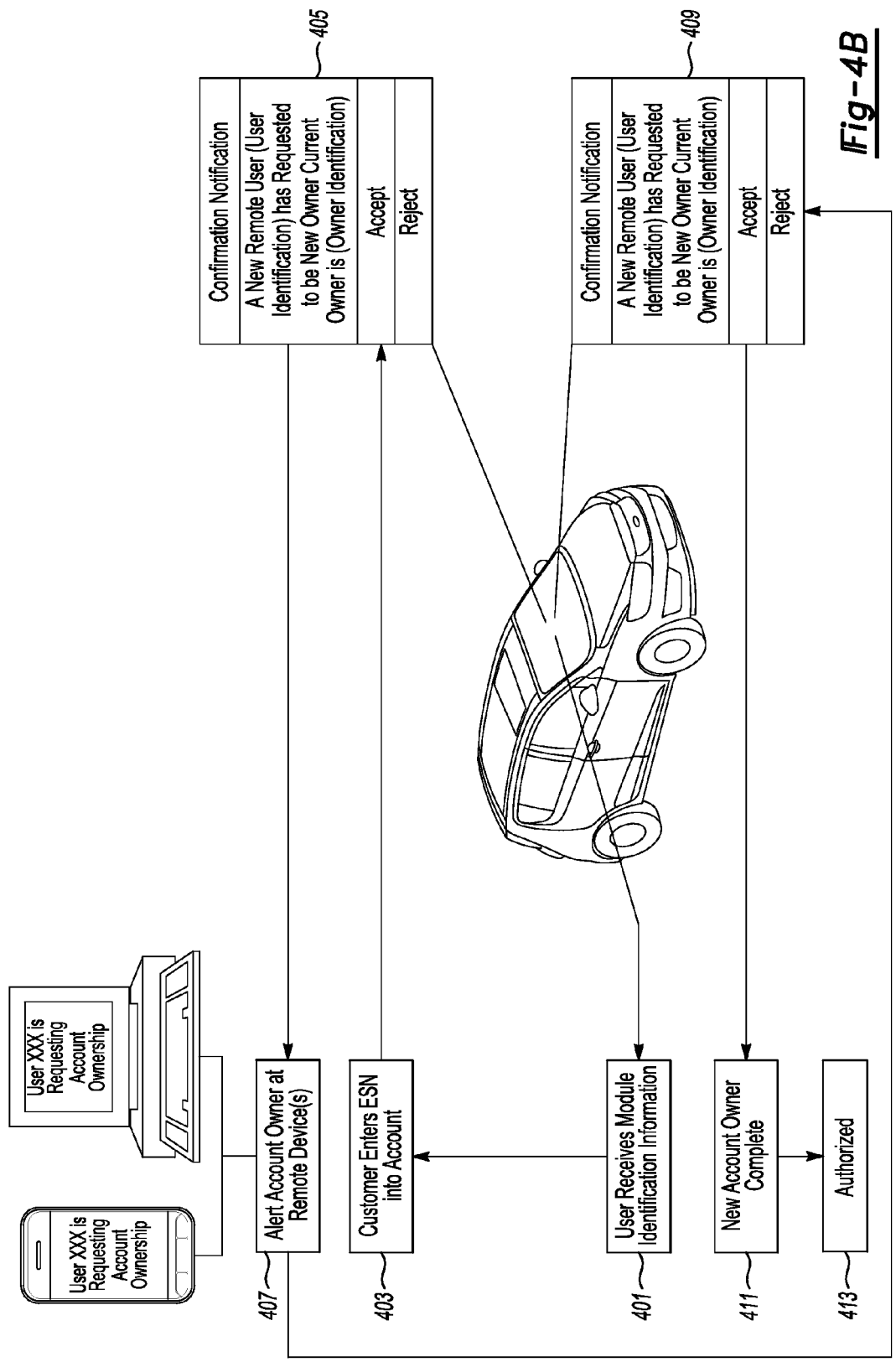
FIG. 4B illustrates a process for authorizing users of the vehicle communications and information computing system according to another embodiment.

FIG. 4B illustrates another embodiment of the authentication process for authorizing system use. As illustrated in FIG. 4B, a user requesting authorization may receive module identification information (such as an ESN) which may be input at the remote device (e.g., the nomadic device 103 or PC 105) (block 401). As described above, this information may be, in some embodiments, received from the module 200 by the user, e.g., after key-on.

After such information is received by the server 101 (block 403), including user identification information, the server 101 may determine that a new account is requested based on, for example, the user information and the module 200 information.

One or more notifications may be transmitted to the authorizing user (e.g., the user already having authorization) indicating that a user has requested authorization (block 405). An authorizing user may be a vehicle dealer or a private owner of the vehicle. The user requesting authorization may be an additional user and/or a substitute user of the system.

The notification may state, as a non-limiting example, "a new remote user (name of user) has requested to be account owner—current owner is (name of current owner)." The notification may also include instructions for the authorizing user to accept or reject the request. This notification may be received on the module 200 display (e.g., and without limitation, as a pop-up notification) and/or in the vehicle as a voice notification. In additional or alternative embodiments, the notification may be received on the ND 103 and/or PC 105 as an email, a text message, instant message, web-based message, and the like (block 407).

In one embodiment, the authorization may be accepted/rejected by the requesting user (who then, if accepted, becomes the additional/substitute user). However, a notification may be received at the ND 103 and/or PC 105 notifying the current owner that authorization is being requested and/or authorization was accepted/rejected.

If the request is rejected by the authorizing user, the requesting user(s) may not be authorized to use the system. However, if accepted by the authorizing user, the requesting user(s) may be added/substituted (block 411) and the user authorized (block 413).

In some embodiments, as illustrated in FIG. 4B, multiple notifications may be sent to the authorizing user. For example, a first notification (block 405) may state that authorization is requested (as described above).

If authorization is accepted, the additional/substitute user(s) may only be permitted limited operation of the module 200. As some non-limiting, non-exhaustive examples, the additional user(s) may be restricted from GPS tracking, vehicle lock and/or unlock, and vehicle charging schedule.

Additional notification(s) may be transmitted after the first notification for granting authorization to the additional/substitute user(s). If authorization is accepted, the additional/substitute user may operate all functions of the module 200 (block 409).

In some embodiments, there may be a period of time that elapses before the additional notification(s) are transmitted. The period of time may be in seconds, minutes, hours, days, or variations thereof. The time gap may provide additional confirmation that the additional/substitute user is authorized. For example, if the period of time that elapses is 24 hours, the time gap may confirm that an owner has confirmed authorization of the additional/substitute user (after the second notification) because a non-owner may not have 24-hour access to the vehicle.

In some instances, however, a vehicle technician may have longer than 24 hour access to the vehicle. In this case, if the unscrupulous technician attempts to self-authorize access to the system (e.g., via the module 200), the vehicle owner may be notified at ND 103 and/or PC 105. The vehicle owner may have an override option which disables authorization to the system 200. Alternatively, accepting or rejecting authorization after the second notification may only be permitted from the ND 103 and/or PC 105 so that accepting/rejecting authorization is not permitted from the vehicle.

Figure 5:
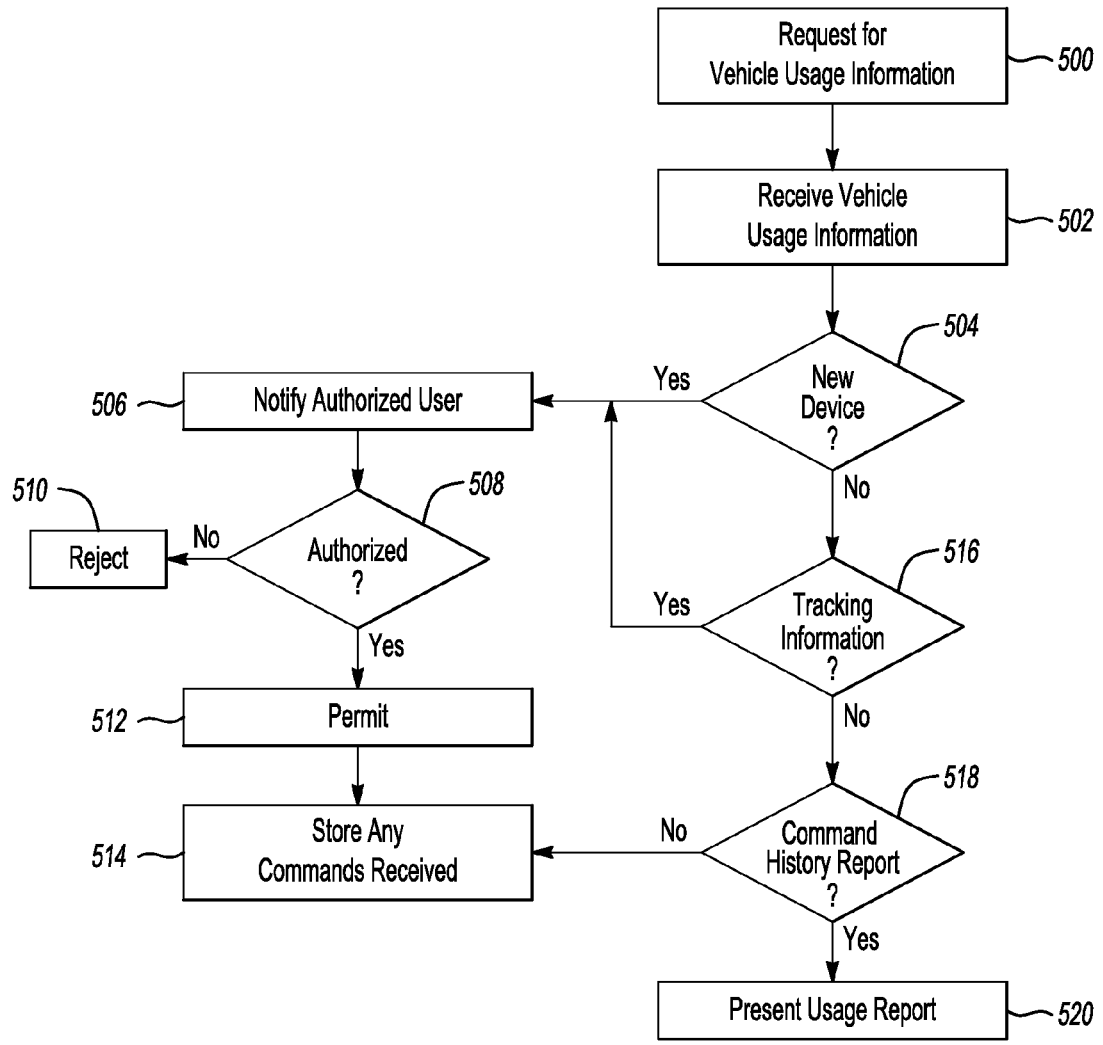
FIG. 5 illustrates a process for providing usage information for the vehicle communications and information computing system to an authenticated user.

An authorized user may monitor the usage of the VCIS 100. FIG. 5 illustrates the process for informing an authorized vehicle user about system usage.

A request may be received in the vehicle or remotely from the vehicle (block 500). The request may be received from an authorized user and/or the module 200. The request may be for information for select system usage or all system usage. Accordingly, the usage information may be received according to the type of information requested (block 502) and presented to an authorized user.

Non-limiting and non-exhaustive examples of usage information that may be obtained and provided to the user are illustrated in FIG. 5. For example, if there are new nomadic device(s) 103 that are associated (e.g., paired) with the module 200 (block 504), a notification may be presented with this information to the user (block 506). The notification may also include an identification of the nomadic device (e.g., the phone number). Notifications may be provided in-vehicle (e.g., on a vehicle display or audibly from one or more speakers), as an e-mail, text message, a phone call, or other such notifications.

In some embodiments, the authorized user may indicate whether the associated nomadic device 103 is authorized (block 508) by rejecting the request (block 510) or permitting/accepting the request (block 512). In some embodiments, granting permission may not require input or instructions from the authorized user. For example, the paired nomadic device 103 may be automatically accepted based on information provided by the authorized user indicating which nomadic device(s) 103 are authorized, which may be stored at server 101.

Additionally or alternatively, the vehicle user may obtain vehicle tracking information (block 516). In this case, a tracking event for tracking the vehicle 121 may be received by the module 200 from another person (at another device) and the vehicle's position transmitted to server 101. As an example, a service technician, having access to the vehicle, may attempt to track the vehicle's location. The vehicle user may be notified of the vehicle tracking (block 506) and may permit (block 512) or deny the tracking (block 510). The process for denying or granting permission is described above and, for purposes of brevity, is not herein repeated.

Additionally or alternatively, the vehicle user may request a command history report (block 518). Commands received by the module 200 may be stored in memory at the vehicle or on the server 101. Accordingly, if a report is not requested, if any command(s) are received by the module 200, the may be stored (block 514). If the vehicle user requests a report, the report may be presented in the vehicle, at the nomadic device 103 or at the personal computer 105 (block 520).

Other non-limiting examples of notifications (not shown) may include notification(s) relating to expiration of a subscription to the service and unavailability of one or more services of the module 200.

While exemplary embodiments are illustrated and described above, it is not intended that these embodiments illustrate and describe all possibilities. Rather, the words used in the specification are words of description rather than limitation, and it is understood that various changes may be made without departing from the spirit and scope of the invention.

What is claimed is:

1. A computer-implemented method for authorizing use of a vehicle communication and information system, the method comprising:
   receiving at one or more data processors information indicating that a vehicle communications and information system (VCIS) is associated with a device from which one or more users commands the VCIS, wherein the information includes a registration code provided by a manufacturer to the one or more users and having been input into the device by the one or more users;
   comparing the registration code to information stored on the VCIS to authenticate the registration code;
   receiving an authorization request to command one or more vehicle controls from the device associated with the VCIS;
   based in least in part on the authentication of the registration code, providing the device with command of one or more vehicle controls; and
   performing an authentication process using the associated device to authenticate the one or more users;
   when authenticated based on the authentication process, enabling the one or more vehicle control commands from the device, wherein an authentication process includes initiating a timer to measure a time period during which the one or more users are authenticated using the identified authenticating devices, wherein the one or more users may command the VCIS from the one or more associated devices when authenticated during the time period.

2. The computer-implemented method of claim 1 further comprising counting a number of authentication attempts during the time period, wherein the one or more users are not authenticated if the number of attempts is exceeded.

3. The computer-implemented method of claim 1 wherein the device is remote from a vehicle.

4. The computer-implemented method of claim 3 wherein the device includes at least one of a nomadic device or a personal computer.

5. The computer-implemented method of claim 1 further comprising:
   performing an authentication process using the associated device to authenticate the one or more users, including:
      receiving the identifying information at the device via user input; and
   storing the associating information at the one or more data processors.

6. The computer-implemented method of claim 5 wherein the VCIS identifying information is an electronic serial number of the VCIS.

7. The computer-implemented method of claim 1 wherein authorizing the one or more users to command the associated VCIS includes authorizing the one or more users to operate select functions of the VCIS.

8. A computer-implemented method comprising:
   receiving at a computer information associating a device for commanding vehicle controls with a vehicle, wherein the information includes a registration code provided by a manufacturer to a user and having been input into the remote device by the user;

comparing the registration code to information stored on the vehicle computer to authenticate the registration code;

receiving at the computer authorization request to command vehicle controls from the device;

based in least in part on authentication of the registration code, enabling the remote device with command of one or more vehicle controls;

performing an authentication process to authenticate the user;

receiving one or more inputs for authentication;

authenticating the user based on the one or more inputs for the authentication process initiating a timer to measure a time period during which the one or more inputs for authentication are received; and authenticating the user based on the one or more inputs for authentication when received during the time period.

9. The computer-implemented method of claim 8 wherein the authentication process further includes:

counting a number of authentication attempts; and authenticating the user based on the one or more inputs for authentication unless the number of attempts is exceeded.

10. The computer-implemented method of claim 8 wherein the device is remote from the vehicle.

11. The computer-implemented method of claim 10 wherein the device remote from the vehicle is a nomadic device or a personal computer.

12. The computer-implemented method of claim 8 wherein the one or more inputs for authentication are one or more authentication items selected from one or more touch-based inputs, information from one or more vehicle key transponders, one or more voice commands, one or more codes, one or more patterns of maneuvers, or at least one question and answer process.

* * * * *